(12) United States Patent
 Massoudi

(10) Patent No.: US 10,594,763 B2
(45) Date of Patent: Mar. 17, 2020

(54) PLATFORM-INDEPENDENT CONTENT GENERATION FOR THIN CLIENT APPLICATIONS

(71) Applicant: adRise, Inc., San Francisco, CA (US)

(72) Inventor: Farhad Massoudi, San Francisco, CA (US)

(73) Assignee: ADRISE, INC., San Francisco, CA (US)

( * ) Notice: Subject to any disclaimer, the term of this patent is extended or adjusted under 35 U.S.C. 154(b) by 630 days.

(21) Appl. No.: 14/846,216

(22) Filed: Sep. 4, 2015

(65) Prior Publication Data

US 2017/0068395 A1     Mar. 9, 2017

Related U.S. Application Data

(63) Continuation of application No. 14/056,880, filed on Oct. 17, 2013, now abandoned.

(60) Provisional application No. 61/800,348, filed on Mar. 15, 2013.

(51) Int. Cl.

| | | |
|---|---|---|
| *H04L 29/08* | (2006.01) | |
| *G06Q 30/02* | (2012.01) | |
| *G06F 9/44* | (2018.01) | |
| *G06F 16/957* | (2019.01) | |
| *G06F 8/38* | (2018.01) | |

(52) U.S. Cl.
CPC ............... *H04L 67/02* (2013.01); *G06F 8/38* (2013.01); *G06F 9/44* (2013.01); *G06F 16/9577* (2019.01); *G06Q 30/0277* (2013.01); *H04L 67/20* (2013.01); *H04L 67/22* (2013.01)

(58) Field of Classification Search
CPC ............ G06F 3/0481; G06F 17/30905; G06Q 30/0277; H04L 67/02; H04L 67/20; H04L 67/22
See application file for complete search history.

(56) References Cited

U.S. PATENT DOCUMENTS

| | | |
|---|---|---|
| 8,776,111 B1 | 7/2014 | Eldering et al. |
| 9,215,123 B1 | 12/2015 | Fears et al. |
| 9,277,275 B1 | 3/2016 | Arini |
| 9,465,604 B1 * | 10/2016 | Burgyan .................. G06F 8/65 |
| 9,563,928 B1 * | 2/2017 | Sokolowski .............. G06T 1/20 |
| 2001/0020255 A1 * | 9/2001 | Hofmann ................ G06F 9/541 |
| | | 719/318 |
| 2002/0129368 A1 | 9/2002 | Schlack et al. |
| 2002/0178126 A1 | 11/2002 | Beck et al. |

(Continued)

*Primary Examiner* — Mandrita Brahmachari
(74) *Attorney, Agent, or Firm* — Redbrick IP, P.C.

(57) ABSTRACT

A system for providing platform-independent content for thin client applications executing on client computing devices, the system including: a computer processor; and a content engine executing on the computer processor and configured to: receive an initial content request identifying a platform of a client computing device; provide platform-independent initial content for the client computing device in response to the initial content request; receive a user engagement request generated based on a user input associated with the initial content; render, in response to the user engagement request, platform-dependent and user-interactive secondary content for the platform of the client computing device; and provide the rendered secondary content for display in a thin client application executing on the client computing device.

20 Claims, 10 Drawing Sheets

(56) References Cited

U.S. PATENT DOCUMENTS

| | | |
|---|---|---|
| 2003/0235184 A1 | 12/2003 | Dorenbosch et al. |
| 2005/0177835 A1* | 8/2005 | Chickering ............ G06F 9/544 719/310 |
| 2006/0075019 A1* | 4/2006 | Donovan ......... G06F 17/30867 709/203 |
| 2006/0253323 A1 | 11/2006 | Phan et al. |
| 2007/0233671 A1 | 10/2007 | Oztekin et al. |
| 2008/0082604 A1* | 4/2008 | Mansour ................ G06F 9/451 709/203 |
| 2008/0259906 A1 | 10/2008 | Shkedi |
| 2009/0006214 A1 | 1/2009 | Lerman et al. |
| 2009/0064301 A1* | 3/2009 | Sachdeva ............... G06F 9/468 726/9 |
| 2009/0089161 A1* | 4/2009 | Ali ..................... G06Q 30/0264 705/14.61 |
| 2009/0106785 A1 | 4/2009 | Pham |
| 2009/0129479 A1 | 5/2009 | Yellamraju |
| 2009/0204478 A1 | 8/2009 | Kaib et al. |
| 2010/0151816 A1 | 6/2010 | Besehanic et al. |
| 2010/0211967 A1 | 8/2010 | Ramaswamy et al. |
| 2010/0246981 A1* | 9/2010 | Hu ....................... G06F 19/321 382/232 |
| 2011/0040636 A1 | 2/2011 | Simmons et al. |
| 2011/0093335 A1 | 4/2011 | Fordyce et al. |
| 2011/0103374 A1 | 5/2011 | LaJoie et al. |
| 2011/0113116 A1 | 5/2011 | Burdette et al. |
| 2011/0125594 A1* | 5/2011 | Brown .................. G06Q 30/02 705/14.73 |
| 2011/0167440 A1 | 7/2011 | Greenfield |
| 2011/0219229 A1 | 9/2011 | Cholas et al. |
| 2011/0246298 A1 | 10/2011 | Williams et al. |
| 2011/0252305 A1* | 10/2011 | Tschani ............ G06F 17/30899 715/234 |
| 2011/0258049 A1 | 10/2011 | Ramer et al. |
| 2012/0007866 A1* | 1/2012 | Tahan ................... G06F 19/321 345/428 |
| 2012/0016655 A1 | 1/2012 | Travieso et al. |
| 2012/0029983 A1 | 2/2012 | Rodriguez et al. |
| 2012/0089455 A1 | 4/2012 | Belani et al. |
| 2012/0102169 A1 | 4/2012 | Yu et al. |
| 2012/0151079 A1 | 6/2012 | Besehanic et al. |
| 2013/0132856 A1* | 5/2013 | Binyamin ............... G06F 3/017 715/740 |
| 2013/0156269 A1* | 6/2013 | Matsui ............... H04N 1/00209 382/107 |
| 2013/0268951 A1 | 10/2013 | Wyatt et al. |
| 2013/0346202 A1 | 12/2013 | Kouladjie et al. |
| 2014/0075014 A1 | 3/2014 | Chourey |
| 2014/0101739 A1 | 4/2014 | Li et al. |
| 2014/0143052 A1 | 5/2014 | Stryker et al. |
| 2014/0157289 A1* | 6/2014 | Aarts .................... G06F 9/541 719/328 |
| 2014/0181243 A1* | 6/2014 | Nieuwenhuys ... H04L 29/06448 709/217 |
| 2014/0282642 A1* | 9/2014 | Needham ......... H04N 21/44218 725/10 |
| 2014/0372415 A1* | 12/2014 | Fernandez-Ruiz ........................ G06F 17/30991 707/722 |
| 2014/0379911 A1 | 12/2014 | Fayssal et al. |
| 2015/0206198 A1* | 7/2015 | Marshall ............ G06Q 30/0276 705/14.72 |
| 2015/0234564 A1* | 8/2015 | Snibbe .................. G06F 3/0488 715/716 |
| 2015/0271540 A1 | 9/2015 | Melby et al. |
| 2015/0382075 A1* | 12/2015 | Neumeier .......... H04N 5/44591 725/34 |
| 2016/0358209 A1 | 12/2016 | Khozani et al. |
| 2016/0360289 A1 | 12/2016 | Santoro et al. |
| 2017/0064411 A1 | 3/2017 | Goli et al. |

* cited by examiner

PLATFORM-INDEPENDENT CONTENT GENERATION FOR THIN CLIENT APPLICATIONS

CROSS-REFERENCE TO RELATED APPLICATION

This application is a continuation of co-pending U.S. application Ser. No. 14/056,880, filed on Oct. 17, 2013 and entitle "INTERACTIVE ADVERTISING," which claims benefit of U.S. Provisional Patent Application No. 61/800, 348, filed on Mar. 15, 2013 and entitled "CONNECTED-TV ADVERTISING, INTERACTIVE VIDEO ADVERTISING, IMAGE-BASED INTERACTIVE ADVERTISING, SECOND SCREEN ADVERTISING, HOUSEHOLD TARGETING, AND PERSONALIZED TV ADVERTISEMENTS." U.S. patent application Ser. No. 14/056,880 and U.S. Provisional Patent Application No. 61/800,348 are incorporated by reference herein, in their entirety.

BACKGROUND

Recent advancements in computing technology have led to a movement for creating internet-connected devices. Inexpensive hardware has contributed to a trend in which traditionally non-connected devices (e.g., televisions, radios, etc.) now include network connectivity. This has also lead to significant technical challenges in the development of client software and services necessary to support these devices.

As the number and type of network-connected computing devices has increased, there has been a fragmentation of content availability and quality among the various platforms. Even the same application can have an entirely different user experience when ported or developed for multiple different platforms and device form factors.

A model for providing content to connected devices involves serving content to a native client application executing on the connected device. Companies wishing to have a presence on such devices are required to invest significant resources in development and support for native applications across a variety of different platforms. Complicating matters, some devices lack the execution environment and rendering functionality required by traditional native applications. These devices are strictly limited in the number and type of applications that they support. As a result of these limitations, many of these devices have limited or no built-in content-providing functionality.

SUMMARY

Embodiments provide technical solutions to the aforementioned and other technical problems. For example, one or more embodiments allow platform-independent content distribution to "thin" client applications executing on various client devices and across a variety of different platforms. As a result, for example, resource-intensive operations (e.g., video encoding or webpage rendering) may be avoided on devices that lack the execution environment and rendering functionality required by traditional native applications. Further, developers can substantially avoid the difficult, costly, and near impossible task of developing platform-specific applications. In another example, one or more embodiments provide interactive user interfaces that may be controlled, manipulated, or navigated by a thin client application executing on a client device. A server may provide an instruction set defining client-interactive controls and identifying a set of images (optionally rendered by the server) to a thin client application. The instruction set may be used to provide a user interface. A user engagement request from a thin client application may include a command for navigating from a current page to a previous page, thereby providing a web browser-like experience on devices that lack the execution environment and rendering functionality required by traditional native applications. In yet another example, one or more embodiments allow targeting or retargeting of content to client devices based on metadata related to internet protocol (IP) addressing.

In general, in one aspect, embodiments relate to a system for providing platform-independent content for thin client applications executing on client computing devices, the system including: a computer processor; and a content engine executing on the computer processor and configured to: receive an initial content request identifying a platform of a client computing device; provide platform-independent initial content for the client computing device in response to the initial content request; receive a user engagement request generated based on a user input associated with the initial content; render, in response to the user engagement request, platform-dependent and user-interactive secondary content for the platform of the client computing device; and provide the rendered secondary content for display in a thin client application executing on the client computing device.

In general, in one aspect, embodiments relate to a method for using a thin client application executing on a client computing device, the method including: generating, by the thin client application, an initial content request identifying a platform of the client computing device; sending the initial content request to an external content provider; receiving platform-independent initial content from the content provider in response to the initial content request; displaying the initial content on a display component of the client computing device; detecting, after displaying the initial content, a user input associated with the initial content; generating, based on the user input, a user engagement request for secondary content; receiving, by the thin client application and from a content engine external to the client computing device, user-interactive secondary content server-side rendered in a platform-dependent format of the client computing device; and displaying the secondary content on the display component.

In general, in one aspect, embodiments relate to a method for providing platform-independent content for thin client applications executing on client computing devices, the method including: receiving an initial content request identifying a platform of a client computing device; providing platform-independent initial content for the client computing device in response to the initial content request; receiving a user engagement request generated based on a user input associated with the initial content; rendering, by a server device of a content engine and in response to the user engagement request, platform-dependent and user-interactive secondary content for the platform of the client computing device; and providing, by the server device, the rendered secondary content for display in a thin client application executing on the client computing device.

In general, in one aspect, embodiments relate to a non-transitory computer-readable storage medium including a set of instructions for providing content, the instructions configured to execute on at least one computer processor to enable the computer processor to: receive an initial content request identifying a platform of a client computing device; provide platform-independent initial content for the client computing device in response to the initial content request;

receive a user engagement request generated based on a user input associated with the initial content; render, by a server device of a content engine and in response to the user engagement request, platform-dependent and user-interactive secondary content for the platform of the client computing device; and provide, by the server device, the rendered secondary content for display in a thin client application executing on the client computing device.

Other aspects of the invention will be apparent from the following description and the appended claims.

BRIEF DESCRIPTION OF THE DRAWINGS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

Embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

In general, embodiments of the invention provide methods and systems for using content generated for a client device. Content can be rendered on a server-side service and provided for the client. User engagement requests can be received by the service and used to render modifications to the content. In one or more embodiments of the invention, one or more instructions associated with the content are provided for the client. In response to the instructions, the client can be configured to request one or more tracking pixels from an external reporting service.

In general, embodiments of the invention provide methods and systems for using advertising content generated for a client device. Advertising content can be rendered on a server-side service and provided for the client. User engagement requests can be received by the service and used to render modifications to the advertising content. In one or more embodiments of the invention, one or more instructions associated with the advertising content are provided for the client. In response to the instructions, the client can be configured to request one or more tracking pixels from an external reporting service.

Figure 1A:
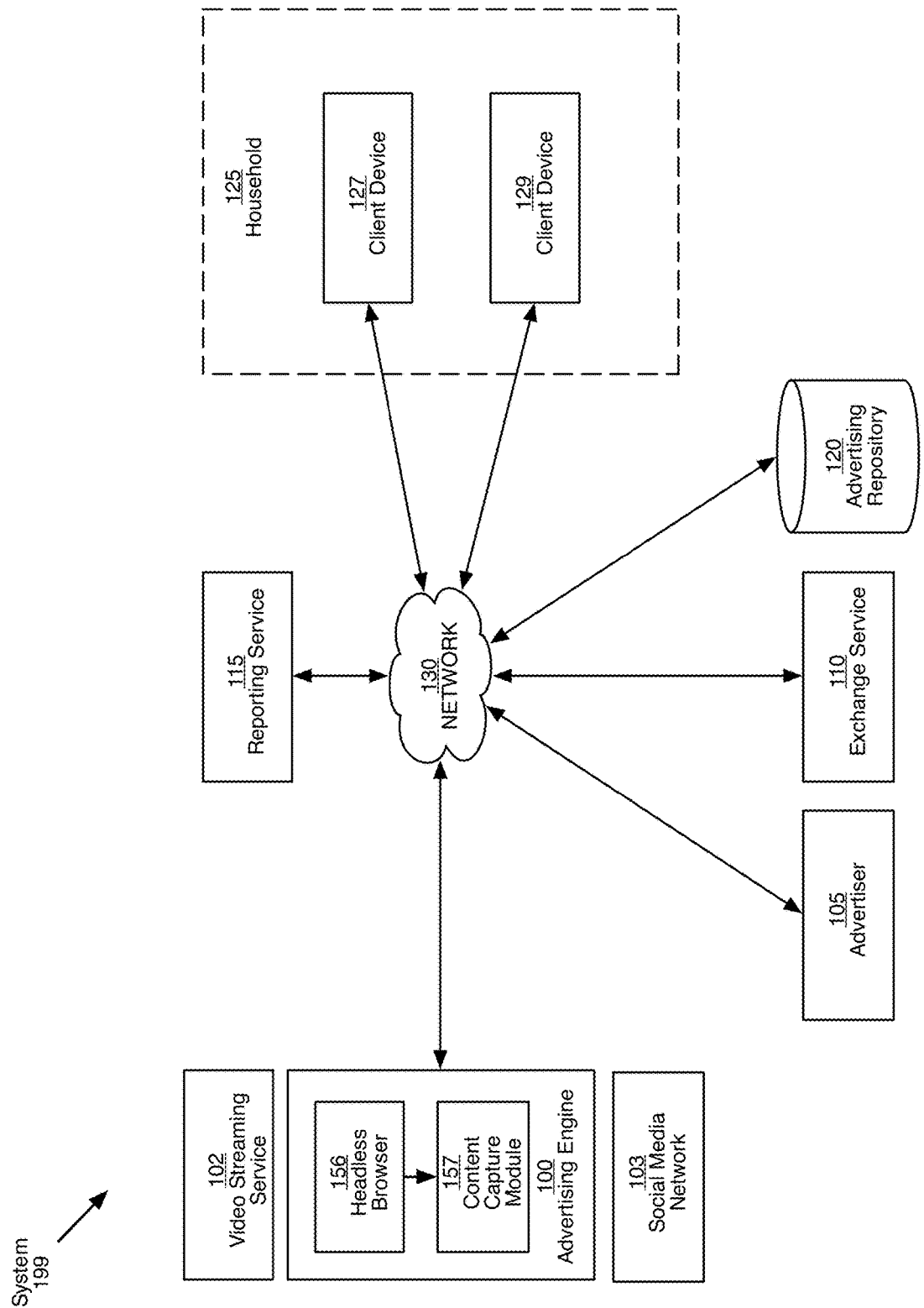
FIGS. 1A and 1B show schematic diagrams of systems, in accordance with one or more embodiments of the invention.

FIG. 1A shows a system (199) in accordance with one or more embodiments of the invention. As shown in FIG. 1A, system (199) has multiple components including an advertising engine (100), an advertising exchange service (110), a reporting service (115), an advertiser (105), a network (130), an advertising repository (120), and client devices (127 and 129) of a household (125). Various components of the system (199) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component executing on a device, as well as any combination of these components within a given embodiment of the invention.

In one or more embodiments of the invention, the advertising engine (100) includes functionality to provide advertising content for one or more client devices (e.g., 127, 129). The advertising engine (100) can be configured to provide advertising content in conjunction and/or in association with content served by any number of content servers (e.g., advertising exchange service (110), a video streaming service, a social media network, etc.). In one or more embodiments of the invention, the advertising engine (100) is a component of an advertising network including one or more content servers configured to obtain and store advertising content (e.g., in the advertising repository (120), for use by the advertising engine (100).

Figure 1B:
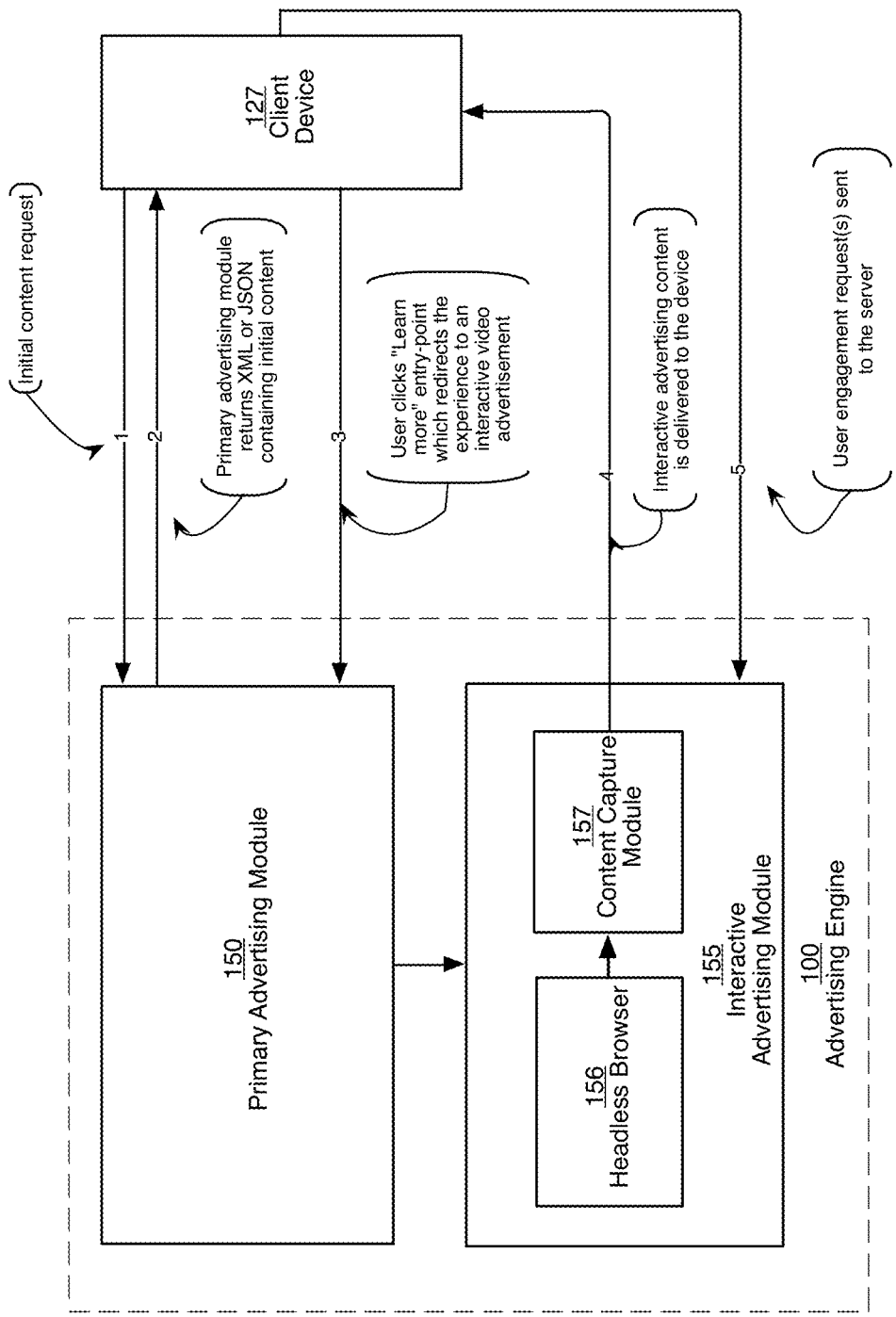

FIG. 1B shows an example implementation of the advertising engine (100) of FIG. 1A, in accordance with one or more embodiments of the invention. As shown in FIG. 1B, the advertising engine (100) has multiple components including a primary advertising module (150) and an interactive advertising module (155) including a headless web browser (156) and a content capture module (157). Various components of the advertising engine (100) can be located on the same device (e.g., a server, mainframe, Personal Computer (PC), and any other device) or can be located on separate devices connected by a network (e.g., a local area network (LAN), the Internet, etc.). Those skilled in the art will appreciate that there can be more than one of each separate component executing on a device, as well as any combination of these components within a given embodiment of the invention.

In one or more embodiments of the invention, the advertising engine (100) includes functionality to receive a content request generated by a client device. The content request can be any notification from the client indicating that the client is ready for receiving content, in accordance with various embodiments. In one or more embodiments, the content request is generated by a thin client application executing on the client device and can include or be sent in conjunction with information identifying a platform of the client device. In the example of FIG. 1B, the content request is received by the primary advertising module (150).

The client device can be configured to request a variety of different types of advertising content (e.g., an advertisement, a video including an advertisement, a web page including an advertisement, etc.). For example, the client device may require advertising content to be displayed before initiating playback of media content, the client device may require a commercial to be played upon reaching a predefined threshold time limit during playback of media content, the client device can detect a user request for advertising content, and/or the client device can detect a user request for secondary advertising content or menus during the display of an initial advertisement.

For example, a thin client application executing on a client device can be configured to detect a user input requesting a video to be streamed to the client. In response to the user input, the thin client application can generate a content request for a video advertisement associated with the requested video. In another example, a client device is configured to automatically play a video advertisement upon opening a web page. In this example, the content request is automatically generated and sent upon opening the web page. In one or more embodiments, the content request is routed through the advertising exchange service (110) and/or one or more other entities (e.g., another content provider service) before being sent to the advertising engine (100).

In one or more embodiments of the invention, the advertising engine (100) includes functionality to provide advertising content for the client device in response to the content request. The advertising content can be provided for a requesting application (e.g., a thin client application) executing on the client device. Examples of advertising content can include, but are not limited to, video, audio, a commercial, a banner ad, a survey, a questionnaire, a menu page, a webpage, a landing page, a login page, a slideshow, a map, and/or an input form. Advertising content can also include data and/or executable code associated with one or more advertisements. For example, a "container" or other data which (1) identifies external advertising content and/or (2) computer instructions for obtaining advertising content. The client device can then use the data and/or instructions (e.g., the "container") to request advertising content (e.g., an advertisement) from any number of sources external to the client device. In the example of FIG. 1B, the primary advertising module (150) is configured to provide the advertising content in response to an initial content request.

In one or more embodiments of the invention, the advertising engine (100) includes functionality to render some or all of the advertising content for display on the client device. For example, the advertising engine (100) can render a video advertisement for playback on a specified mobile device platform. The advertising content can be a static video and/or can be an interactive advertisement designed to be displayed in conjunction with, before, and/or after related content is displayed by the a client application. In one or more embodiments, in cases where the client application (e.g., a thin client application) is not capable of rendering some or all of the advertising content, the advertising engine (100) can be configured to perform server-side rendering of some or all of the advertising content. In this case, the thin client application is configured to display the rendered advertising content and to send user engagement requests to the advertising engine (100) in order to request modifications to the advertising content and/or to request new advertising content.

In one or more embodiments of the invention, the advertising engine (100) includes functionality to receive a user engagement request generated by the client device. The user engagement request can be generated based on a user input associated with advertising content. For example, a thin client application can generate a user engagement request in response to a user clicking a "Learn More" button in an advertisement (e.g., step "3" of FIG. 1B). In the example of FIG. 1B, the primary advertising module (150) receives the user engagement request from the client (127) and passes the request to the interactive advertising module (155) (e.g., by sending a message to the interactive advertising module (155)) to be fulfilled.

In one or more embodiments of the invention, the advertising engine (100) includes functionality to render advertising content for the specific platform of the client device. In one or more embodiments of the invention, an initial set of advertising content is generated and provided for the client device (e.g., step "1" of FIG. 1B). If a user input is detected in response to the initial content (e.g., step "3" of FIG. 1B), secondary advertising content may be generated for the client (e.g., by the interactive advertising module (155) of FIG. 1B). For example, the advertising engine (100) can be configured to (1) stream a video advertisement for the client device (initial advertising content, e.g., step "2" of FIG. 1B), (2) receive a user engagement request, and then (3) send secondary advertising content (e.g., step "4" of FIG. 1B) in response to the user engagement request to the client device. In one example, initial advertising content can be sent in response to any type of client request, while secondary advertising content can be sent specifically in response to a user input associated with the initial advertising content.

In one or more embodiments of the invention, the initial advertising content is provided in a static predefined format across all clients, while the secondary content is rendered specifically in the format of each requesting client. In other words, the secondary advertising content can be rendered in a platform-dependent format of the client device. For example, the initial content can be a video, image, audio, or other type of content streamed or provided for the client device in a platform-independent format, while the secondary advertising content rendered in a platform-dependent format includes a richer interactive user interface (UI) enabling user interaction. Alternatively, in one or more embodiments of the invention, both the initial and secondary content are server-side rendered in the platform-dependent format of the client and/or include dynamic UI elements. In yet another embodiment, the initial content is rendered by the client device, while the advertising content is rendered by the advertising engine (100). In the example of FIG. 1B, the initial advertising content is provided by the primary advertising module (150) and the secondary advertising content is provided by the interactive advertising module (155).

In one or more embodiments of the invention, the advertising engine (100) includes functionality to provide the rendered advertising content for display on the client device. Providing the advertising content can include establishing a connection with the client device, and/or maintaining the connection while the advertising content is displayed to a user of the client device. In one or more embodiments, the advertising engine (100) ends the connection upon closing or receiving a request to close a user interface displaying the advertising content. As discussed, in the example of FIG. 1B, the rendered advertising module can be provided by the interactive advertising module (155).

In one or more embodiments of the invention, the advertising engine (100) includes functionality to continue to leave open a connection with the client in order to provide additional client instructions to the client. For example, after receiving a content request, a connection between the advertising engine (100) and client device may be opened. The advertising engine (100) may continue to leave the connection open through keep-alive signals. As a result, the advertising engine (100) may continue to provide further client instructions to the client device through the open connection.

In one or more embodiments of the invention, an application (e.g., a thin client application) executing on the client device includes functionality to receive the advertising content and to display the advertising content to a user. In one or more embodiments, the advertising content includes an interactive user interface. For example, the application can be configured to display the interactive user interface to a user and to receive user input by an input device (e.g., input device (628) of FIG. 6, discussed below). In response to the user input, the application can send one or more user engagement requests to the advertising engine (100) and can receive modifications to the advertising content from the advertising engine (100). In the example of FIG. 1B, the interactive user interface and subsequent modifications are provided by the interactive advertising module (155) in response to one or more user engagement requests.

In one or more embodiments of the invention, a user engagement request includes a command for modifying the advertising content. For example, an interactive user interface included in the advertising content can be modified by sending a user engagement request including a command to the advertising engine (100). The advertising engine (100) can be configured to render new advertising content in response to one or more commands. For example, a command can be generated based on selecting a menu item, navigating a web page, moving a cursor, selecting a streaming video or other content, and/or any other form of interaction with advertising content displayed by the client device. Each command can request a predefined modification to the content. For example, a scroll command can request a page to be scrolled, while a page selection command can request that a new page be displayed.

In one or more embodiments of the invention, the advertising engine (100) includes functionality to provide one or more instructions for the client application. An instruction can request the client application to perform a specified action. In one or more embodiments, the instruction requests a tracking pixel from an external reporting service. In one or more embodiments, the instruction can be associated with any portion of the advertising content and can include a condition for performing the specified action. For example, the instruction can request a tracking pixel from a reporting service upon detecting engagement with a specified user interface (UI) element. In this example, the client application detects a user engagement with the UI element and subsequently triggers the instruction to execute. Examples of engagement with a UI element can include, but are not limited to, viewing a web page, selecting a button, hovering over a display area, interacting with a widget, typing into a text box, and viewing a particular content item for a period of time exceeding a predefined threshold. In the example of FIG. 1B, the one or more instructions are provided by the interactive advertising module (155) in conjunction with the secondary advertising content. In another example, multiple instructions are each mapped to different web pages. In this example, in response to detecting engagement with a web page (e.g., detecting the user has viewed the web page, displaying the web page, etc.), the advertising engine (100) is configured to execute the instruction in order to request a tracking pixel from a third party server (e.g., a reporting service). In one or more embodiments, no initial advertising content and/or user engagement requests are needed to generate and provide the secondary advertising content. For example, the advertising engine (100) can be implemented without the primary advertising module (150)).

In one or more embodiments of the invention, an identifier of a client device is identified using a tracking pixel or other tracking mechanism identified by the client. For example, the tracking pixel may be identified by a client device and a tracking request may be sent to the advertising engine (100), reporting service (115), and/or a data provider, from the client device. The request can include an IP address of the client device, and the IP address can be stored by the advertising engine (100) in the advertising repository (120). The advertising engine (100) can be configured to associate the IP address with a user profile and/or a household profile, in accordance with various embodiments. In one or more embodiments of the invention, a response from the advertising engine (100), reporting service (115), and/or data provider is sent to the client device. The response may include an image, pixel, or other requested content.

In one or more embodiments of the invention, the advertising engine (100) is configured to send multiple instructions associated with various different portions of the advertising content to the client device. Although some or all of the advertising content can be rendered by the advertising engine (100), in one or more embodiments, it may be advantageous to perform certain actions on the client. For example, in order to enable advertising reporting functionality of the reporting service (115), the client application may be required to request the tracking pixels directly from the reporting service (115). In this example, certain reporting services gather client-specific data required for performing analytics and/or calculating advertising-related data. Thus, the client must make certain requests (enabled by sending instructions to the client for those specific requests) directly to the reporting service (115) and/or other external entities.

In one or more embodiments of the invention, the advertising engine (100) is configured to communicate with multiple reporting services. For example, the advertising engine (100) can be configured to provide content referencing any number of tracking pixels or images, each referencing a different reporting service. An internal reporting service communicatively coupled to the advertising engine (100) (or a component of the advertising engine (100)) can perform analytics across multiple sets of data served to multiple clients of the advertising engine (100). A third party reporting service external to the advertising engine (100) can be configured to provide independently verified analytics/engagement data to one or more advertising customers or partners having a relationship with the advertising engine (100).

In one or more embodiments of the invention, the advertising engine (100) includes functionality to provide an instruction to request a tracking pixel from an external reporting service (115) at a predefined interval. In response to the instruction, the client application can then request the tracking pixel from the reporting service (115) at the predefined interval while displaying the advertising content. Upon closing of the advertising content, the client application can be configured to cease requesting the tracking pixel. In one or more embodiments, the reporting service (115) is configured to estimate a display time of the advertising content based on a number of accesses of the tracking pixel from the reporting service. Thus, if the instruction dictates that the pixel should be requested every 2 seconds, the reporting service (115) can be configured to calculate a number of times (N) the tracking pixel was requested during the current session, and to estimate the display time as N*2.

In one or more embodiments of the invention, the advertising engine (100) is configured to obtain some or all of the advertising content from the advertising exchange service (110). The advertising engine (100) can be configured to perform required rendering for various different client platforms and to serve the rendered content to one or more client devices. Furthermore, the advertising engine (100) can be configured to receive requests on behalf of client devices from the advertising exchange service (110). Thus, the advertising exchange service (110) can include functionality to match specific advertising content to client requests based on predefined advertiser subscription data or other related information.

In one example, the advertising exchange service (110) may provide advertisement placement opportunities on client devices to potential advertisers (e.g., through an automatic bidding process). Accordingly, the advertising exchange service (110) may act as a "middleman" between the advertiser (105) and a client device (e.g., 127, 129). For example, the advertising exchange service (110) may be coupled with the client device through the network (130). The advertising exchange service (110) may request advertising content that will be ultimately provided to the client device. For example, the advertising exchange service (110) may receive the content request from the client device and in turn communicate the content request to the advertising engine (100). Alternatively, the advertising exchange service (110) may determine that an advertisement should be shown on the client device and therefore generate a content request for an advertisement from the advertising engine (100) that will be ultimately provided to the client device. In one or more embodiments of the invention, user engagement requests from the client are also routed through the advertising exchange service (110). Regardless of the format or specific request, user engagement request can refer to any request or series of requests resulting from a user input associated with advertising content. Thus, the advertising exchange service (110) can be configured to receive a notification from the client and request advertising content from the advertising engine (100) in response to the notification. In this example, both the notification and the subsequent request can be referred to as a single user engagement request, since the notification and the subsequent request were caused by a common user input.

In the example of FIG. 1B, the interactive advertising module (155) optionally includes a headless web browser (156) configured to render advertising content for one or more client platforms. Thus, in one or more embodiments, some or all of the rendering functionality of the advertising engine (100) is performed by the headless web browser. The headless web browser (156) (or other component of the advertising engine responsible for rendering) can be configured to emulate presentation of one or more web pages in order to serve content rendered for a specified platform. The headless web browser (156) can be configured to render an instance of the web page on the server, and to emulate interactions with the instance of the web page in response to one or more user engagement requests. By performing server-side rendering of some or all advertising content delivered to a client, development of client applications may be simplified. In one or more embodiments of the invention, a traditional web browser and/or another component of the interactive advertising module (155) is used to render advertising content for one or more clients.

In the example of FIG. 1B, the content capture module (157) includes functionality to capture content intended for the client (127) from the headless browser (156) and to provide the captured content to the client (127). In other words, the content capture module (157) is configured to extract the advertising content from the headless browser (156) and/or to ignore non-advertising related content generated, for example, during emulation of a web page. Content generated by the headless browser can be stored by the content capture module (157) and provided to the client (127) at a later time. For example, the content capture module (157) can be configured to stream a video to the client (127) over a period of time, although some portion (or the entirety) of the video can be rendered by the headless browser (156) in advance of the streaming.

In one or more embodiments of the invention, the client devices (127 and 129) represent any type or form of computing device or system. For example, the client device may be an Internet-connected television, a smart television, a smart Blu-ray player, an automobile Internet-connected computer, a gaming console, a streaming set-top box, a mobile telephone, a tablet computer, a personal computer, and/or any operable to display advertisements or receive user actions. The term television client can refer to any computing device connected to or associated with a television. Examples of a television client can include a set-top box, smart TV, cable box, Internet-connected television, and any other television-related device. In one or more embodiments of the invention, the client devices (127 and 129) are both located within the same household (125). It should be appreciated that in one or more embodiments of the invention, the client devices (127 and 129) are not located within the same household.

In one or more embodiments of the invention, the client devices (127 and 129) may be operable to receive or capture user actions (e.g., a television remote control event, a gaming console controller event, a touchscreen event, a mobile telephone event, a tablet computer event, a personal computer event, a gesture event, a movement event, a gyroscope event, an accelerometer event, a voice command, and/or any other event receivable by a client device). For example, a user may use the directional pad (D-pad) of a television remote control to provide directional commands and the "OK" or "Select" button of the television remote control to make a selection.

Figure 5A:
FIGS. 5A-5E show exemplary depictions of advertising content, in accordance with one or more embodiments of the invention.
Figure 5A:
Figure 5B:
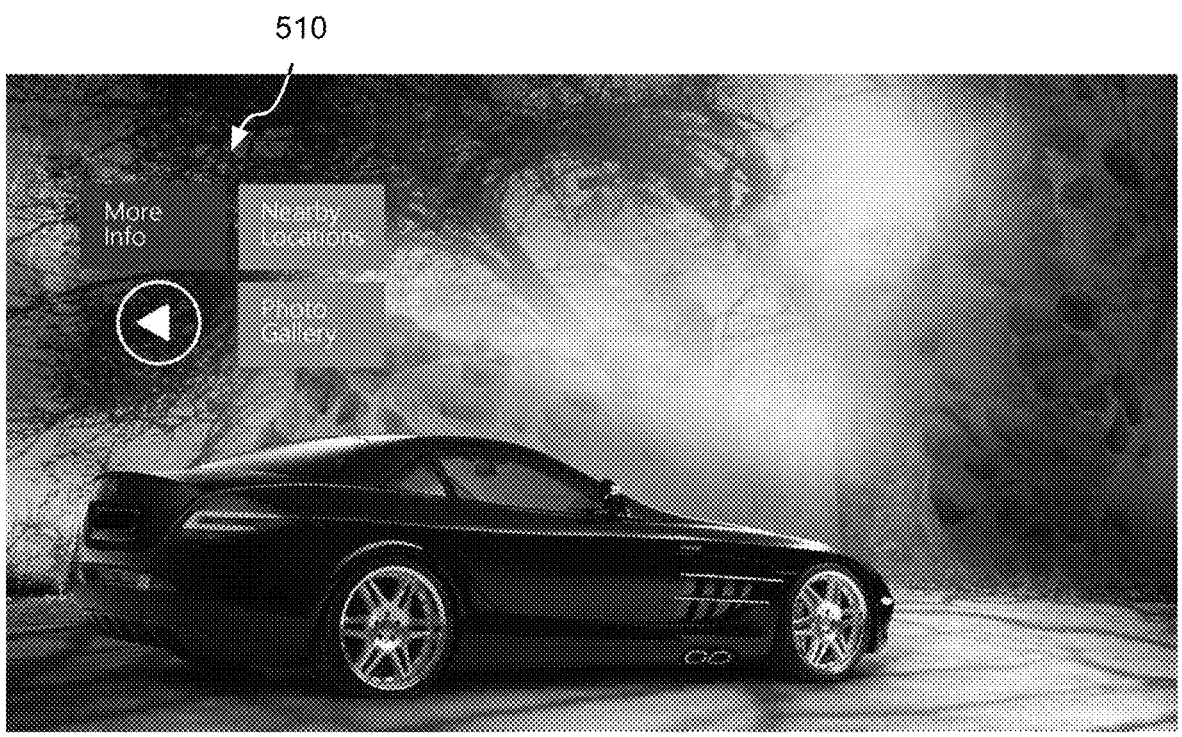
Figure 5C:
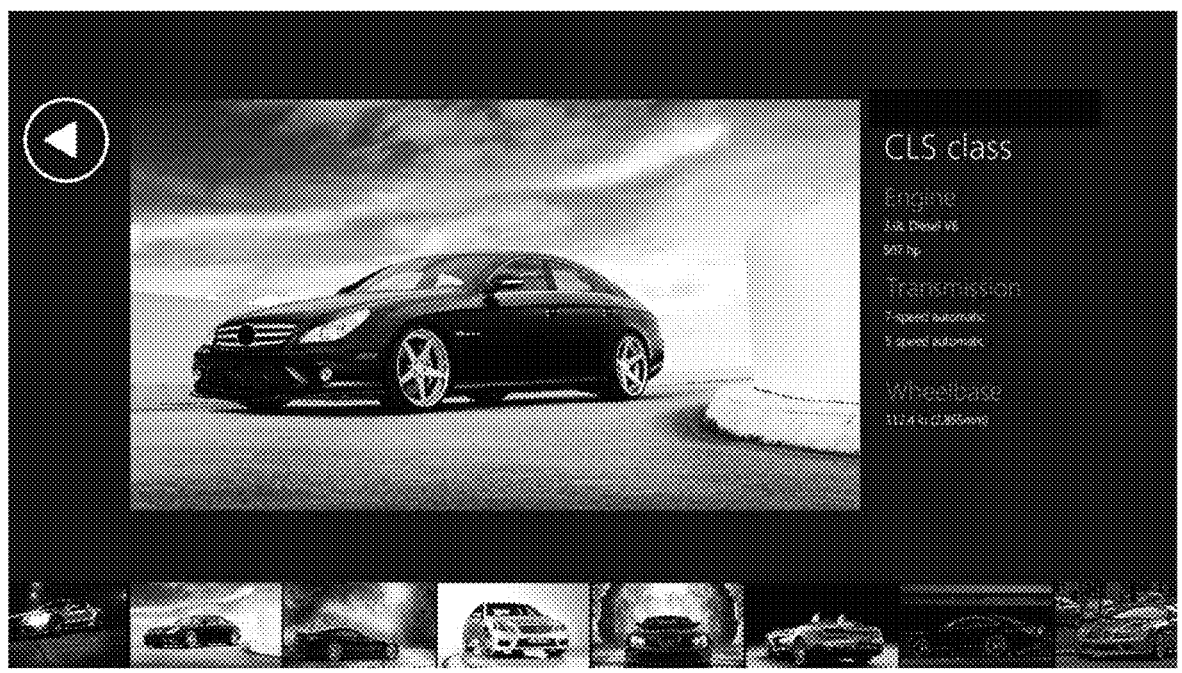
Figure 5D:
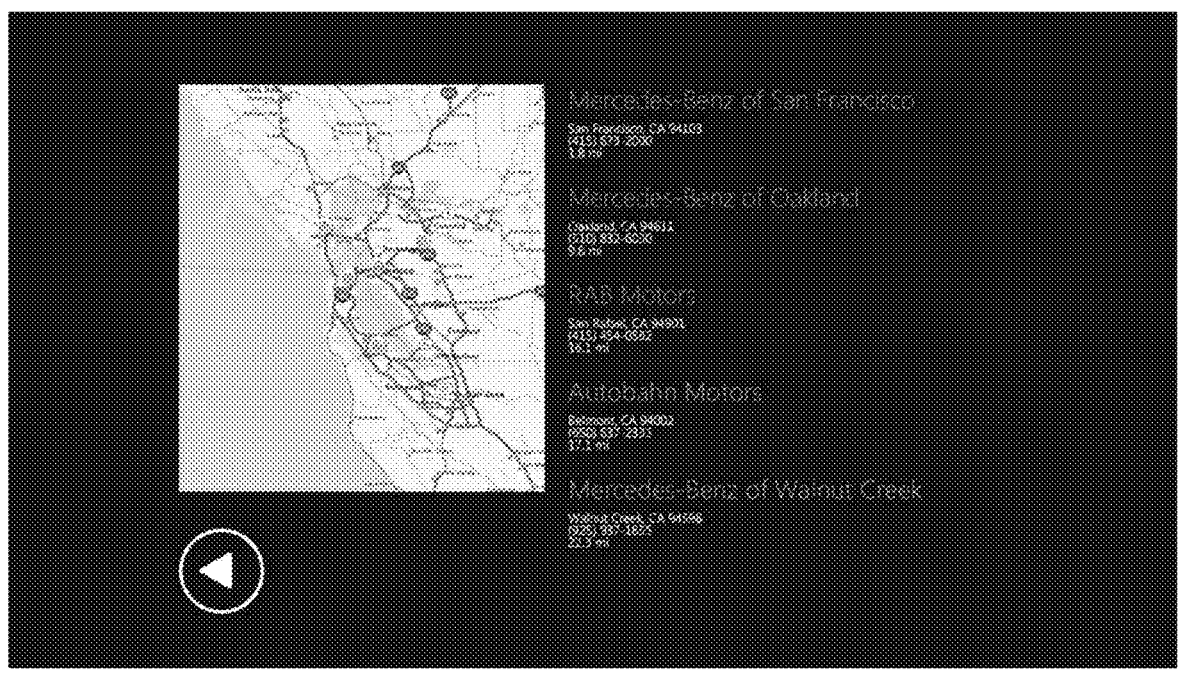
Figure 5E:

FIGS. 5A-5E show exemplary depictions of advertising content, according to one or more embodiments of the invention. The advertising content may be displayed on the client device. In one or more embodiments, the advertising content includes one or more controls. For example, FIG. 5B shows advertising content including buttons (510) for More Info, Nearby Locations, Photo Gallery, and a back button. A user may perform a selection of one of the buttons (510). In response to the user input, the client device may generate a user engagement request to be sent to the advertising engine (100) in order to request modifications to the advertising content. For example, the user interface depicted by FIG. 5B is modified to the user interface depicted by FIG. 5D in response to the user clicking the "More Info" button shown in FIG. 5B. Upon clicking the button, a user engagement request is sent through an advertising exchange service (110) to an advertising engine (100). In response to the user engagement request, the advertising engine (100) renders the advertising content depicted by FIG. 5D and sends the rendered content to the client device for display. Similarly, the advertising content depicted by FIG. 5E is provided in response to the user selecting the "Nearby Locations" button shown in FIG. 5B.

In one or more embodiments of the invention, the client device first provides the content request to the advertising exchange server (110), which in turn provides the content request to the advertising engine (100).

Continuing to refer to the example of FIG. 5B, if the advertising engine (100) receives a client event reflecting a selection of the More Info button, the advertising engine (100) may generate an advertisement with more information about a product (e.g., the advertisement shown by FIG. 5C).

In one or more embodiments of the invention, the advertising content is generated by an external service and stored in the advertising repository (120) for use by the advertising engine (100). Thus, it should be appreciated that, instead of generating the advertisement, the advertising engine (100) can be configured to instead access the advertising repository (120) to provide a previously generated advertisement.

In one or more embodiments of the invention, the advertising engine (100) includes functionality to first compress and/or encrypt the advertising content before providing for the client device. Further, the advertising engine (100) may be configured to send the advertising content in various formats, for example, as an H.264 stream, as an MP4 stream, as an HTTP Live Streaming (HLS) stream, and so on.

In one or more embodiments of the invention, the advertising engine (100) includes functionality to send the advertising content over a network. For example, the advertising engine (100) may send the advertising content through the network (130) to the client device for eventual display on the client device. In one or more embodiments, advertising content can be generated in response to one or more user engagement requests and sent to the client device. Accordingly, the advertising content can include an interactive user interface that may be controlled, manipulated, or navigated by a client device.

In one or more embodiments of the invention, the client is configured to send one or more user engagement requests to the advertising engine (100). For example, a user engagement request may include a command for navigating from a current page to a previous page. For example, if FIG. 5A depicts a previous screen, the command may request to navigate from the advertisement screen depicted in FIG. 5B back to the advertisement screen depicted in FIG. 5A.

In one or more embodiments of the invention, the advertising engine (100) is a software application or a software service (e.g., a set of related software applications) configured to execute on one or more hardware processors. The advertising engine (100) can include one or more processes configured to concurrently send and receive data from multiple external entities (e.g., client devices, advertising exchange service (110), advertising repository (120), etc.). The advertising engine (100) can be a component of a service-oriented architecture (SOA) or any other software platform, either inside or outside of an advertising network, in accordance with various embodiments. In one or more embodiments of the invention, one or more components of the advertising engine (100) reside in a cloud computing application in a network distributed system. In one or more embodiments of the invention, advertising engine (100) is integrated within or operatively connected to one or more other components of the system (199) (e.g., advertising exchange service (110)).

In one or more embodiments of the invention, the primary advertising module (150) and the interactive advertising module (155) are software applications or software services (e.g., a set of related software applications) configured to execute on one or more hardware processors. The primary advertising module (150) and the interactive advertising module (155) can include one or more processes configured to concurrently send and receive data from multiple external entities (e.g., client devices, advertising exchange service (110), advertising repository (120), etc.). The primary advertising module (150) and/or the interactive advertising module (155) can be components of a service-oriented architecture (SOA) or any other software platform, either inside or outside of an advertising network, in accordance with various embodiments. In one or more embodiments of the invention, one or more components of the primary advertising module (150) and/or the interactive advertising module (155) reside in a cloud computing application in a network distributed system. In one or more embodiments of the invention, primary advertising module (150) and/or the interactive advertising module (155) is integrated within or operatively connected to one or more other components of the system (199) (e.g., advertising exchange service (110)).

In one or more embodiments of the invention, the advertising exchange service (110) and the reporting service (115) are software applications or software services (e.g., sets of related software applications) configured to execute on one or more hardware processors. Thus, advertising exchange service (110) and reporting service (115) can include one or more processes configured to concurrently send and receive data from multiple external entities (e.g., advertising engine (100), etc.). The advertising exchange service (110) and/or the reporting service (115) can be components of a service-oriented architecture (SOA) or any other software platform, either inside or outside of an advertising network, in accordance with various embodiments. In one or more embodiments of the invention, one or more components of the advertising exchange service (110) and/or the reporting service (115) reside in a cloud computing application in a network distributed system. In one or more embodiments of the invention, advertising exchange service (110) and/or the reporting service (115) is integrated within or operatively connected to one or more other components of the system (199).

In one or more embodiments of the invention, the advertising repository (120) is a database and/or storage service residing on one or more servers. For example, the advertising repository (120) can be implemented as a storage service using service-oriented architecture (SOA) and configured to receive requests for data and to provide requested data to other components of the system (199). In another example, the advertising repository (120) can include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application can be used, in accordance with various embodiments of the invention.

In one or more embodiments of the invention, the advertising repository (120) is a separate application or set of applications residing on one or more servers external (and communicatively coupled) to the system (199). Alternatively, in one or more embodiments of the invention, the advertising repository (120) can be an integrated component of an advertising system and/or can reside, either partially or entirely, on one or more common hardware devices (e.g., a server).

Figure 2:
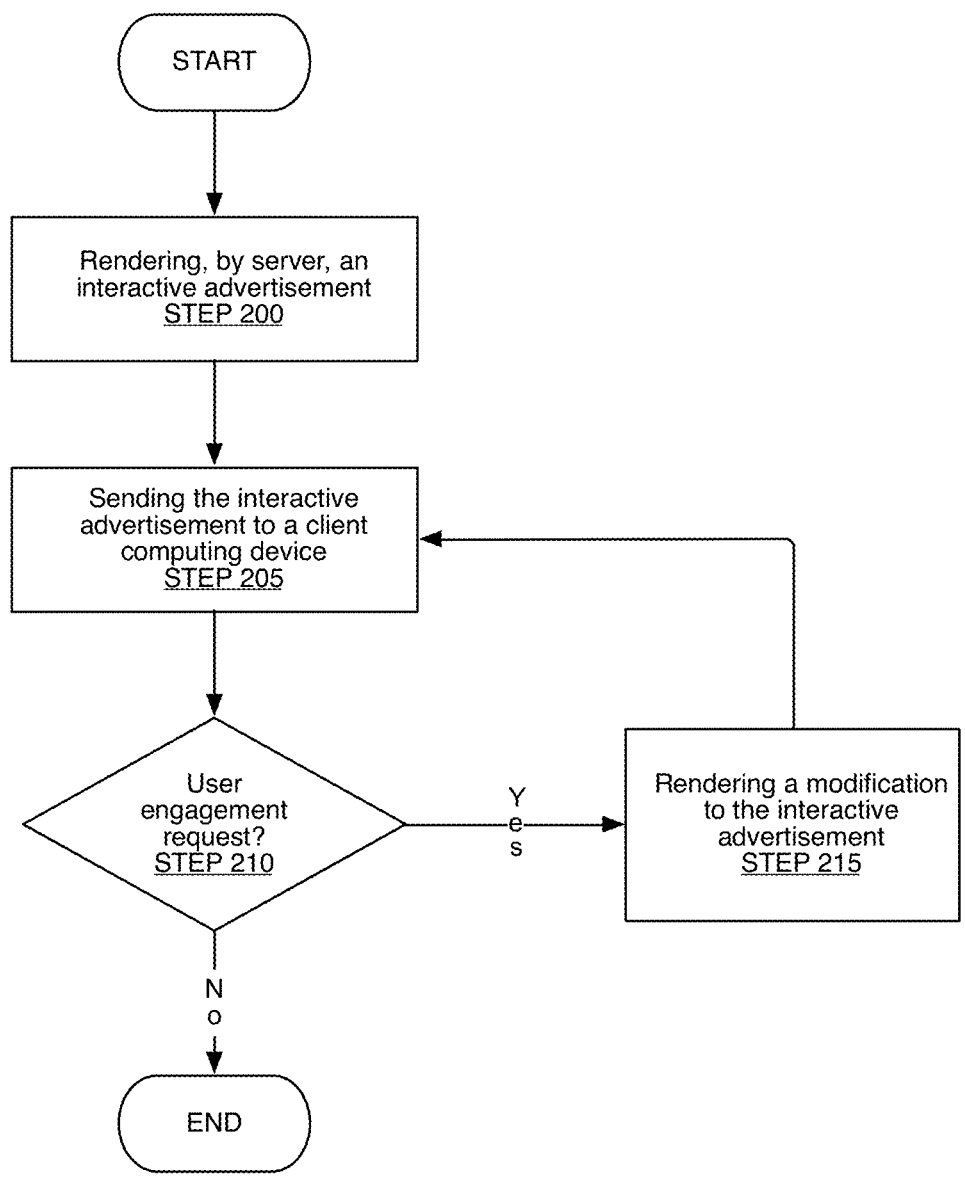
FIGS. 2-4 depict flowcharts of exemplary processes, in accordance with one or more embodiments of the invention.

FIG. 2 shows a flowchart of a method for providing an interactive advertisement, in accordance with one or more embodiments of the invention. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 2 should not be construed as limiting the scope of the invention. In one or more embodiments, the steps of FIG. 2 can be performed by an advertising engine (e.g., advertising engine (100) of FIG. 1A, discussed above).

In STEP 200, in one or more embodiments of the invention, an interactive advertisement is rendered by a server (e.g., advertising engine (100) of FIG. 1A, discussed above). The rendering process can include any platform specific modification to the advertisement to enable presentation by a client device, in accordance with various embodiments.

In STEP 205, in one or more embodiments of the invention, the rendered interactive advertisement is sent to the client computing device. The interactive advertisement can be sent from the server by way of one or more intermediary services (e.g., advertising exchange service (110) of FIG. 1A, discussed above).

In STEP 210, in one or more embodiments of the invention, it is determined whether a user engagement request is received. Assuming that the interactive advertisement is actively displayed to the user, the process continues awaiting detection of user input at the client computing device while the interactive advertisement is continued to be actively displayed. If it is determined that that a user engagement request is not received, and that the interactive advertisement is no longer actively displayed (e.g., due to an exit command or a timeout), the process ends. If a user engagement request is received (due to user input at the client device), the process proceeds to STEP 215.

In STEP 215, in one or more embodiments of the invention, a modification is rendered to the interactive advertisement. Rendering the modification can include rendering any new advertising content associated with the interactive advertisement, in accordance with various embodiments.

Figure 3:
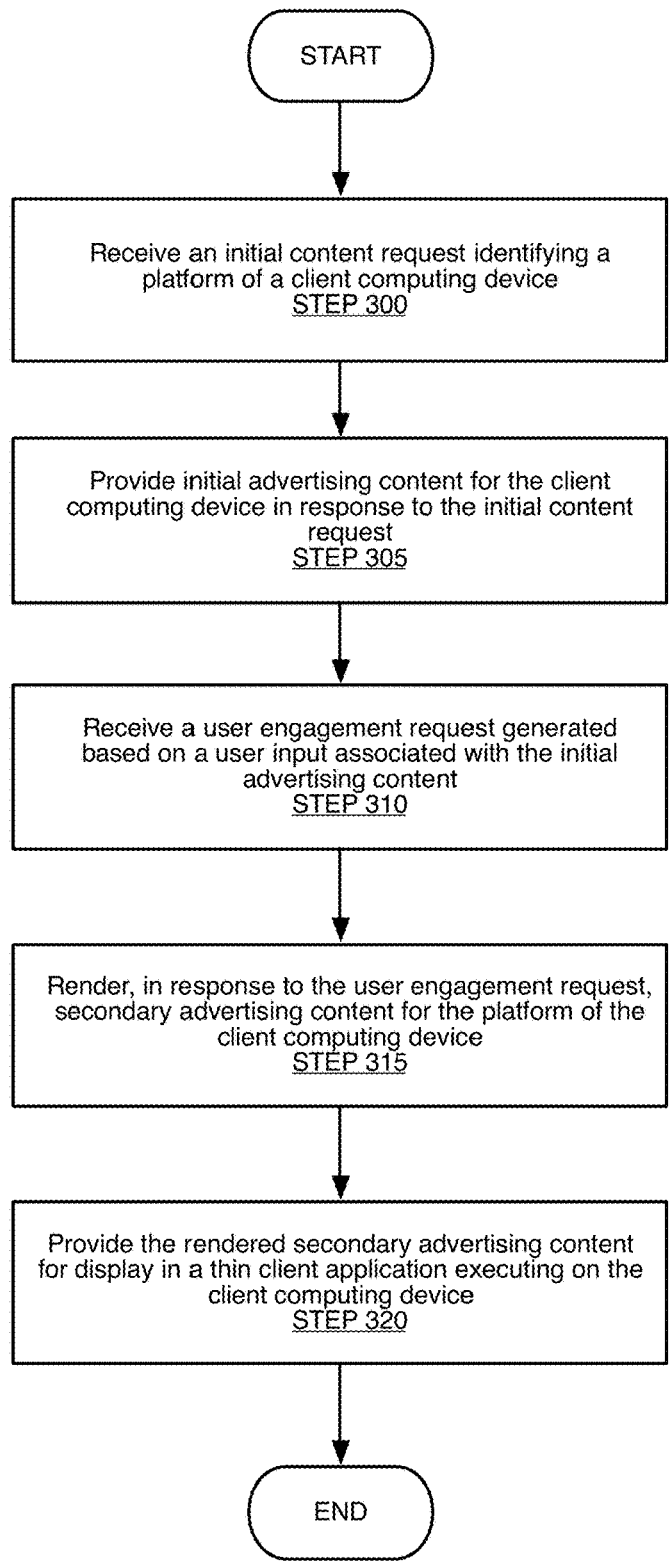

FIG. 3 shows a flowchart of a method for providing advertising content, in accordance with one or more embodiments of the invention. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 3 should not be construed as limiting the scope of the invention. In one or more embodiments, the steps of FIG. 3 can be performed by an advertising engine (e.g., advertising engine (100) of FIG. 1A, discussed above).

In STEP 300, in one or more embodiments of the invention, an initial content request identifying a platform of a client computing device is received. The request can be received from a client device or from one or more intermediary services of an advertising network, in accordance with various embodiments. The request can be generated based on a user input or a trigger on the client device (e.g., launching an application/window/page).

In STEP 305, in one or more embodiments of the invention, initial advertising content for the client computing device is provided in response to the initial content request. The initial advertising content can be obtained from an advertising repository (e.g., advertising repository (120) of FIG. 1A, discussed above), or any other source.

In STEP 310, in one or more embodiments of the invention, a user engagement request is received. The user engagement request is generated based on a user input associated with the initial advertising content. One or more user engagement requests can be received at any point and in any order after displaying advertising content. Thus, additional user engagement requests can be received after or during STEPS 315 and 320. In one or more embodiments, any number of user engagement requests can be received, each depicting a request for advertising content and/or a modification to displayed advertising content.

In STEP 315, in one or more embodiments of the invention, in response to the user engagement request, secondary advertising content is rendered for the platform of the client computing device. The secondary advertising content can be provided from a same source or a different source than the initial advertising content, in accordance with various embodiments of the invention.

In STEP 320, in one or more embodiments of the invention, the rendered secondary advertising content is provided for display in a thin client application executing on the client computing device. In one or more embodiments, the thin client application can be an application executing on a specialized client computing device with limited network connectivity and/or rendering functionality. The secondary advertising content can be obtained from a first entity (e.g., advertising exchange service (110) of FIG. 1A, discussed above) and rendered by a second entity (e.g., advertising engine (100) of FIG. 1A, discussed above), in accordance with various embodiments.

Figure 4:
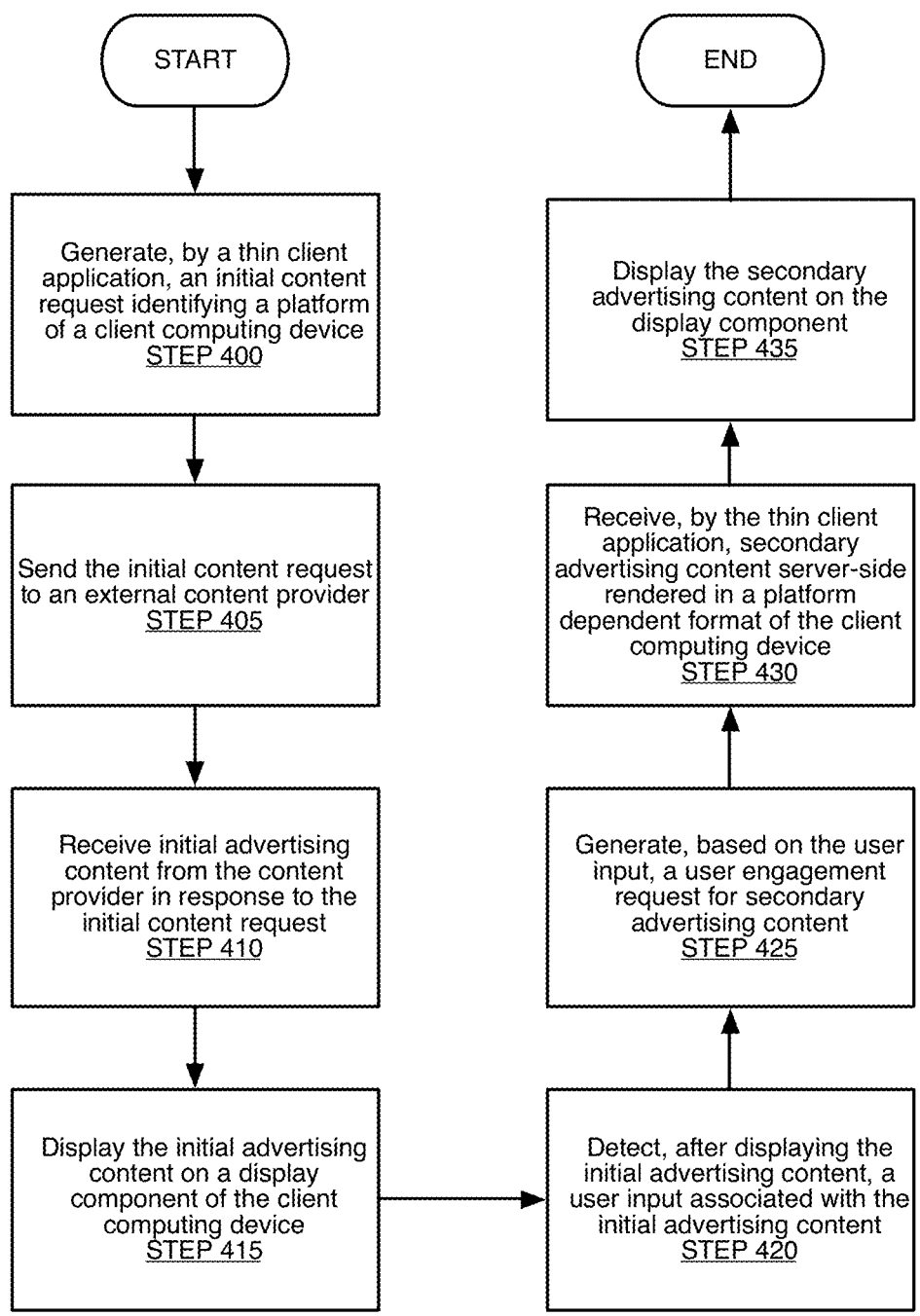

FIG. 4 shows a flowchart of a method for receiving and displaying advertising content by a client computing device, in accordance with one or more embodiments of the invention. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 2 should not be construed as limiting the scope of the invention. In one or more embodiments, the steps of FIG. 4 can be performed by an advertising engine (e.g., advertising engine (100) of FIG. 1A, discussed above).

In STEP 400, in one or more embodiments of the invention, an initial content request identifying a platform of a client computing device is generated by a thin client application executing on the client computing device. The initial content request can be generated by the client in response to a trigger or some functionality of a client application. For example, upon launching a streaming video portal, the client application can send a request for a streaming video. In one or more embodiments, the request for the streaming video can be sent to a streaming video content provider, which subsequently requests (from an advertising content provider) advertising content to stream back to the client in conjunction with the video content. Conversely, in one or more embodiments, the client application can request both advertising and video content (from the same or separate content providers) in conjunction with launching the streaming video portal. In STEP 405, in one or more embodiments of the invention, the initial content request is sent to an external content provider.

In STEP 410, in one or more embodiments of the invention, initial advertising content is received from the content provider in response to the initial content request. The initial advertising content is displayed on a display component of the client computing device (STEP 415).

In STEP 420, in one or more embodiments of the invention, after displaying the initial advertising content, a user input associated with the initial advertising content is detected. For example, a user can select a "Learn More" button or link displayed at the end of a streaming video advertisement.

In STEP 425, in one or more embodiments of the invention, based on the user input, a user engagement request for secondary advertising content is generated. The user engagement request can be any request for new and/or modified advertising content. In one or more embodiments, the user engagement request is sent to the external content provider.

In STEP 430, in one or more embodiments of the invention, secondary advertising content is received by the thin client application. In one or more embodiments, the secondary advertising content is server-side rendered in a platform-dependent format of the client computing device and sent to the thin client application from the external content provider. In STEP 435, in one or more embodiments of the invention, the secondary advertising content is displayed on the display component.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 6:
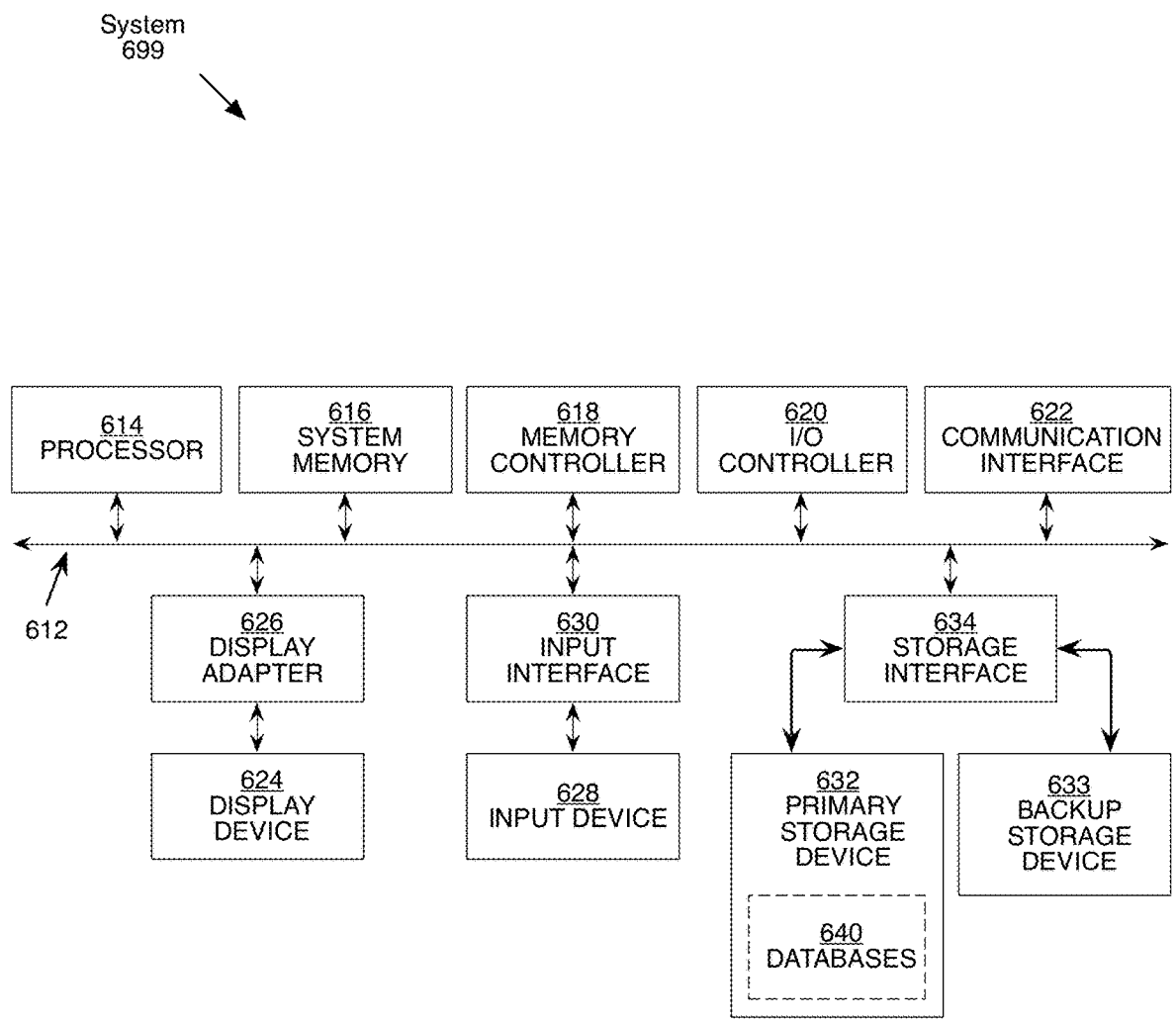
FIGS. 6 and 7 are block diagrams of exemplary computing systems, in accordance with one or more embodiments of the invention.

FIG. 6 is a block diagram of an example of a computing system 699 capable of implementing embodiments of the present disclosure. Computing system 699 broadly represents any single or multi-processor computing device or system capable of executing computer-readable instructions. Examples of computing system 699 include, without limitation, workstations, laptops, client-side terminals, servers, distributed computing systems, handheld devices, or any other computing system or device. In its most basic configuration, computing system 699 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, RAM, ROM, flash memory, or any other suitable memory device. Although not required, in certain embodiments computing system 699 may include both a volatile memory unit (such as, for example, system memory 616) and a non-volatile storage device (such as, for example, primary storage device 632).

Computing system 699 may also include one or more components or elements in addition to processor 614 and system memory 616. For example, in the embodiment of FIG. 6, computing system 699 includes a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 699. For example, memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, I/O controller 620 may control or facilitate transfer of data between one or more elements of computing system 699, such as processor 614, system memory 616, communication interface 622, display adapter 626, input interface 630, and storage interface 634.

Communication interface 622 broadly represents any type or form of communication device or adapter capable of facilitating communication between example computing system 699 and one or more additional devices. For example, communication interface 622 may facilitate communication between computing system 699 and a private or public network including additional computing systems. Examples of communication interface 622 include, without limitation, a wired network interface (such as a network interface card), a wireless network interface (such as a wireless network interface card), a modem, and any other suitable interface. In one embodiment, communication interface 622 provides a direct connection to a remote server via a direct link to a network, such as the Internet. Communication interface 622 may also indirectly provide such a connection through any other suitable connection.

Communication interface 622 may also represent a host adapter configured to facilitate communication between computing system 699 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 622 may also allow computing system 699 to engage in distributed or remote computing. For example, communication interface 622 may receive instructions from a remote device or send instructions to a remote device for execution.

As illustrated in FIG. 6, computing system 699 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data for display on display device 624.

As illustrated in FIG. 6, computing system 699 may also include at least one input device 628 coupled to communication infrastructure 612 via an input interface 630. Input device 628 generally represents any type or form of input device capable of providing input, either computer- or human-generated, to computing system 699. Examples of input device 628 include, without limitation, a keyboard, a pointing device, a speech recognition device, or any other input device.

As illustrated in FIG. 6, computing system 699 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 699.

In one example, databases 640 may be stored in primary storage device 632. Databases 640 may represent portions of a single database or computing device or it may represent multiple databases or computing devices. For example, databases 640 may represent (be stored on) a portion of computing system 699 and/or portions of example network architecture 799 in FIG. 7 (below). Alternatively, databases 640 may represent (be stored on) one or more physically separate devices capable of being accessed by a computing device, such as computing system 699 and/or portions of network architecture 799.

Continuing with reference to FIG. 6, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 699. For example, storage devices 632 and 633 may be configured to read and write software, data, or other computer-readable information. Storage devices 632 and 633 may also be a part of computing system 699 or may be separate devices accessed through other interface systems.

Many other devices or subsystems may be connected to computing system 699. Conversely, all of the components and devices illustrated in FIG. 6 need not be present to practice the embodiments described herein. The devices and subsystems referenced above may also be interconnected in different ways from that shown in FIG. 6. Computing system 699 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 699. All or a portion of the computer program stored on the computer-readable medium may then be stored in system memory 616 and/or various portions of storage devices 632 and 633. When executed by processor 614, a computer program loaded into computing system 699 may cause processor 614 to perform and/or be a means for performing the functions of the example embodiments described and/or illustrated herein. Additionally or alternatively, the example embodiments described and/or illustrated herein may be implemented in firmware and/or hardware.

For example, a computer program for requesting advertising content for display by a thin client application may be stored on the computer-readable medium and then stored in system memory 616 and/or various portions of storage devices 632 and 633. When executed by the processor 614, the computer program may cause the processor 614 to perform and/or be a means for performing the functions required for carrying out the process described with regard to the flowchart of FIG. 4 (discussed above).

Figure 7:
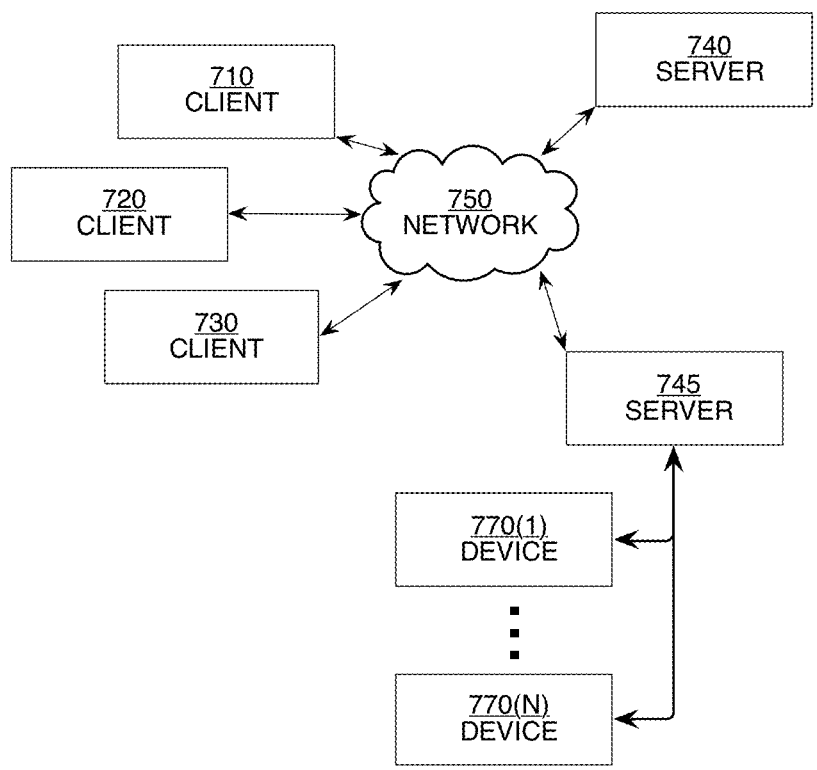

FIG. 7 is a block diagram of an example of a network architecture 799 in which client systems 710, 720, and 730 and servers 740 and 745 may be coupled to a network 750. Client systems 710, 720, and 730 generally represent any type or form of computing device or system, such as clients 127 and 129 of FIG. 1A.

Similarly, servers 740 and 745 generally represent computing devices or systems, such as application servers or database servers, configured to provide various database services and/or run certain software applications (e.g., functionality of advertising engine 100 of FIG. 1A, primary advertising module 150 of FIG. 1B, and interactive advertising module (155), discussed above). Network 750 generally represents any telecommunication or computer network including, for example, an intranet, a wide area network (WAN), a local area network (LAN), a personal area network (PAN), or the Internet.

With reference to computing system 699 of FIG. 6, a communication interface, such as communication interface 622, may be used to provide connectivity between each client system 710, 720, and 730 and network 750. Client systems 710, 720, and 730 may be able to access information on server 740 or 745 using, for example, a Web browser, thin client application, or other client software. Such software may allow client systems 710, 720, and 730 to access data hosted by server 740, server 745, or storage devices 770(1)-(N). Although FIG. 7 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 740, server 745, storage devices 770(1)-(N), or any combination thereof. All or a portion of one or more of the example embodiments disclosed herein may also be encoded as a computer program, stored in server 740, run by server 745, and distributed to client systems 710, 720, and 730 over network 750.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A system for providing platform-independent content for thin client applications executing on client computing devices, the system comprising:
   a computer processor; and
   a content engine executing on the computer processor and configured to:
      receive an initial content request identifying a platform of a client computing device from a thin client application executing in fullscreen mode on the client computing device;
      provide platform-independent initial content for the client computing device in response to the initial content request, wherein:
         platform-independent initial content is provided in a static and predefined format to different types of client computing devices,
         the initial content is server-side encoded in response to an incapability of encoding the initial content by the thin client application, and
         the platform-independent initial content is displayed by the client computing device;
      receive a user engagement request generated based on a user input associated with the initial content;
      render, in response to the user engagement request, user-interactive secondary content in a platform-dependent format for the platform of the client computing device based on the platform identification, wherein the rendering includes server-side video encoding; and
      provide the rendered secondary content for display in a thin client application executing on the client computing device.

2. The system of claim 1, wherein the secondary content comprises an interactive user interface, and the content engine is further configured to:
   receive a plurality of user engagement requests from the thin client application, each of the plurality of user engagement requests comprising a command for modifying the interactive user interface; and
   for each of the plurality of user engagement requests:
      render a modification to the interactive user interface based on the command, and
      provide the modification for display on the client computing device.

3. The system of claim 1, wherein the content engine is further configured to:
   provide, for the thin client application, an instruction to request a tracking pixel, wherein the thin client application requests the tracking pixel from a reporting service in response to the instruction and in conjunction with displaying the secondary content.

4. The system of claim 1, wherein:
   the platform-independent initial content is provided by a first module within an advertising engine;
   the user-interactive secondary content is rendered and provided by a second module within the advertising engine; and
   a reporting service is (1) remote from and (2) communicatively coupled to the advertising engine, and wherein the reporting service is configured to provide content referencing tracking pixels on multiple client computing devices.

5. A method for using a thin client application executing on a client computing device, the method comprising:
- generating, by the thin client application, an initial content request identifying a platform of the client computing device, wherein the thin client application is executing in fullscreen mode on the client computing device;
- sending the initial content request to an external content provider;
- receiving platform-independent initial content from the content provider in response to the initial content request, wherein:
  - platform-independent initial content is provided in a static and predefined format to different types of client computing devices,
  - the initial content is server-side encoded in response to an incapability of encoding the initial content by the thin client application, and
  - the platform-independent initial content is displayed by the client computing device;
- displaying the initial content on a display component of the client computing device;
- detecting, after displaying the initial content, a user input associated with the initial content;
- sending, based on the user input, a user engagement request for secondary content;
- receiving, by the thin client application and from a content engine external to the client computing device, user-interactive secondary content server-side rendered in a platform-dependent format of the client computing device based on the platform identification, wherein the server-side rendering includes video encoding; and
- displaying the secondary content on the display component.

6. A method for providing platform-independent content for thin client applications executing on client computing devices, the method comprising:
- receiving an initial content request identifying a platform of a client computing device from a thin client application executing in fullscreen mode on the client computing device;
- providing platform-independent initial content for the client computing device in response to the initial content request, wherein:
  - platform-independent initial content is provided in a static and predefined format to different types of client computing devices,
  - the initial content is server-side encoded in response to an incapability of encoding the initial content by the thin client application, and
  - the platform-independent initial content is displayed by the client computing device;
- receiving a user engagement request generated based on a user input associated with the initial content;
- rendering, by a server device of the content engine and in response to the user engagement request, user-interactive secondary content in a platform-dependent format for the platform of the client computing device, wherein the rendering includes video encoding; and
- providing, by the server device, the rendered secondary content for display in a thin client application executing on the client computing device.

7. The method of claim 6, wherein the secondary content comprises an interactive user interface, and the method further comprising:
- receiving a plurality of user engagement requests from the thin client application, each of the plurality of user engagement requests comprising a command for modifying the interactive user interface; and
- for each of the plurality of user engagement requests:
  - rendering a modification to the interactive user interface based on the command, and
  - providing the modification for display on the client computing device.

8. The method of claim 7, further comprising:
- providing a set of instructions for the thin client application, each of the set of instructions requesting a tracking pixel from an external reporting service,
- wherein each of the set of instructions is mapped to one of a plurality of user interface elements, and
- wherein the thin client application requests the tracking pixel in response to detecting user engagement with the mapped user interface element.

9. The method of claim 7, further comprising:
- establishing a server connection with the client computing device; and
- maintaining the server connection while the interactive user interface is displayed.

10. The method of claim 6, further comprising:
- providing, for the thin client application, an instruction to request a tracking pixel, wherein the thin client application requests the tracking pixel from a reporting service in response to the instruction and in conjunction with displaying the secondary content.

11. The method of claim 6, wherein the initial content comprises advertising content and the initial content is obtained from an advertising exchange service.

12. The method of claim 6, wherein the secondary content comprises a web page, and wherein rendering the secondary content is performed by a headless web browser executing on a server device.

13. The method of claim 6, further comprising:
- sending, to the thin client application, an instruction to request a tracking pixel from an external reporting service at a predefined interval, wherein the thin client application requests the tracking pixel from reporting service at the predefined interval while displaying the secondary content; and
- estimating a display time of the secondary content based on a number of accesses of the tracking pixel from the reporting service.

14. The method of claim 6, wherein the client computing device is one selected from a group consisting of a network-connected television, a smart television, a smart Blu-ray player, an automobile network-connected computer, a gaming console, and a streaming set-top box.

15. The method of claim 6, wherein the user input is obtained by one selected from a group consisting of a television remote control, a gaming console controller event, a touchscreen, a motion detector, and a voice command.

16. A non-transitory computer-readable storage medium comprising a plurality of instructions for providing content, the instructions configured to execute on at least one computer processor to enable the computer processor to:
- receive an initial content request identifying a platform of a client computing device from a thin client application executing in fullscreen mode on the client computing device;
- provide platform-independent initial content for the client computing device in response to the initial content request, wherein:
  - platform-independent initial content is provided in a static and predefined format to different types of client computing devices, the initial content is server-side encoded in response to an incapability of encoding the initial content by the thin client application, and the platform-independent initial content is displayed by the client computing device;

receive a user engagement request generated based on a user input associated with the initial content;

render, by a server device of a content engine and in response to the user engagement request, user-interactive secondary content in a platform-dependent format for the platform of the client computing device based on the platform identification, wherein the rendering includes video encoding; and provide, by the server device, the rendered secondary content for display in a thin client application executing on the client computing device.

17. The non-transitory computer-readable storage medium of claim 16, wherein the secondary content comprises an interactive user interface, and the plurality of instructions further configured to enable the computer processor to:

receive a plurality of user engagement requests from the thin client application, each of the plurality of user engagement requests comprising a command for modifying the interactive user interface; and for each of the plurality of user engagement requests:
render a modification to the interactive user interface based on the command, and
provide the modification for display on the client computing device.

18. The non-transitory computer-readable storage medium of claim 17, the plurality of instructions further configured to enable the computer processor to:

provide a set of instructions for the thin client application, each of the set of instructions requesting a tracking pixel from an external reporting service,
wherein each of the set of instructions is mapped to one of a plurality of user interface elements, and
wherein the thin client application requests the tracking pixel in response to detecting user engagement with the mapped user interface element.

19. The non-transitory computer-readable storage medium of claim 16, the plurality of instructions further configured to enable the computer processor to:

provide, for the thin client application, an instruction to request a tracking pixel, wherein the thin client application requests the tracking pixel from a reporting service in response to the instruction and in conjunction with displaying the secondary content.

20. The non-transitory computer-readable storage medium of claim 16, the plurality of instructions further configured to enable the computer processor to:

send, to the thin client application, an instruction to request a tracking pixel from an external reporting service at a predefined interval, wherein the thin client application requests the tracking pixel from reporting service at the predefined interval while displaying the secondary content; and identify a display time of the secondary content estimated based on a number of accesses of the tracking pixel from the reporting service.

* * * * *